L. P. EVANS.
CHERRY SEEDER.
No. 64,651. Patented May 14, 1867.
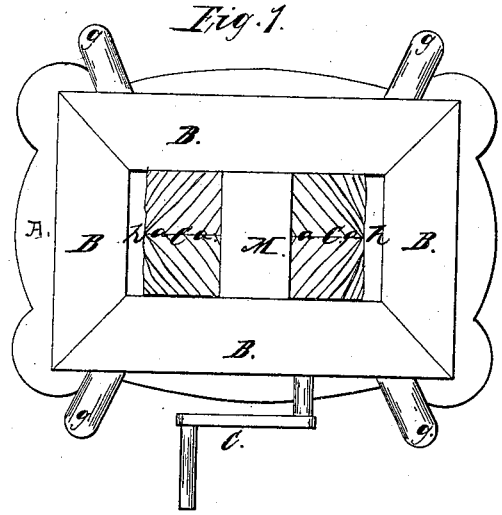
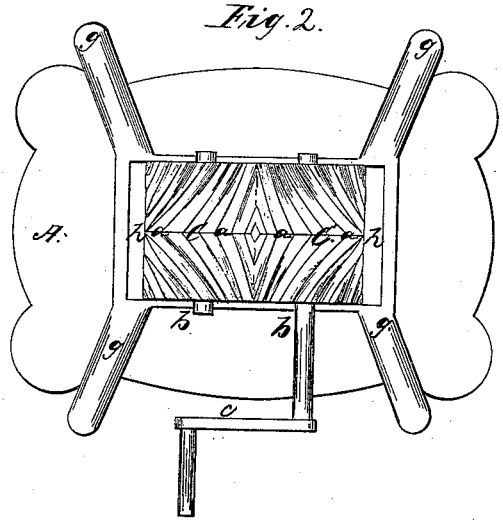
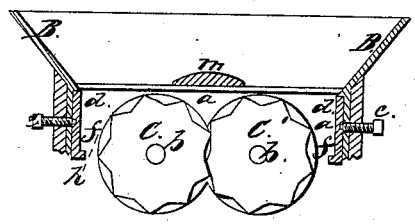

United States Patent Office.

LOT P. EVANS, OF SPRINGVILLE, PENNSYLVANIA.

Letters Patent No. 64,651, dated May 14, 1867.

---

IMPROVED CHERRY-SEEDER.

---

The Schedule referred to in these Letters Patent and making part of the same.

---

TO ALL WHOM IT MAY CONCERN:

Be it known that I, LOT P. EVANS, of Springville, in the county of Chester, and State of Pennsylvania, have invented an improved Machine for Seeding Cherries; and I do hereby declare that the following is a full, clear, and exact description of the same, reference being had to the accompanying drawing, and to the letters of reference marked thereon.

My invention consists in the employment of a machine for splitting and seeding cherries, composed of one or two cylinders, each of which has a series of screw-threads formed on it, those of one half having a contrary inclination to those of the other half, meeting in the centre, and forming a series of points, and of such of other device as is hereinafter shown. On reference to the accompanying drawing, which forms a part of this specification—

Figure 1 is a plan view.
Figure 2 is a plan view with hopper B removed; and
Figure 3 is a sectional view.
Similar letters refer to similar parts in the several views.

A is a stand or frame; B is a hopper fixed to the same; C and C' are cylinders, each having a series of V-shaped threads of the same size and pitch, and so contrived that the threads of one half of each cylinder have a contrary inclination to those of the other half, each thread meeting its corresponding opposite one in a sharp point, and the threads of each half of one cylinder have the same inclination as the threads of the corresponding half of the other cylinder, and gear with the same. $b\ b'$ are shafts carrying the cylinders. $c$ is a lever on the end of the shaft $b'$ for giving motion to the cylinders. $d\ d'$ are graduating plates, one at each end of the hopper, which regulate the space between them and the cylinders, by means of the screws $e\ e'$, for seeding cherries of different sizes. On cherries being put into the hopper, and motion imparted to the cylinders by the lever $c$, the cherries are carried by the cylinders against the plates $d\ d'$, and are there split open by the points $a\ a$, &c., of the threads, leaving the seeds free to drop on to the projections $f\ f'$ of the graduating plates and be carried by the threads out through the spouts $g$, while the flesh of the cherries, being pliable, accommodates to the spaces $h$ contained between the cylinders and the plates, and drops into receptacles beneath the cylinders. The tops of the screw-threads form knife-edges, thereby splitting the cherries without pressing them, and keeping the juice in the flesh, adding greatly to their flavor when dried. Two cylinders are used merely to expedite the operation of seeding. I therefore do not confine myself to that number, but will use either one or two, as the case may be, and also propose to make the cylinders and threads either of metal or of hard rubber.

What I claim as my invention, and desire to secure by Letters Patent, is—

The cylinders $b\ b'$ and the plates $d\ d'$, arranged and operating with respect to each other substantially as herein specified and described.

In testimony whereof I hereunto sign my name to this specification in presence of two subscribing witnesses.

LOT P. EVANS.

Witnesses:
P. G. CAREY,
SAMUEL KNEAMEN.